United States Patent
Kawakami et al.

(10) Patent No.: US 7,503,987 B2
(45) Date of Patent: Mar. 17, 2009

(54) GAS GENERATING AGENT, PROCESS FOR PRODUCTION THEREOF, AND GAS GENERATOR FOR AIR BAGS

(75) Inventors: Tameo Kawakami, Himeji (JP); Eishi Sato, Himeji (JP); Koji Wakisaka, Himeji (JP); Kazuhisa Tamura, Himeji (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 105 days.

(21) Appl. No.: 10/535,401

(22) PCT Filed: Nov. 21, 2003

(86) PCT No.: PCT/JP03/14931

§ 371 (c)(1),
(2), (4) Date: May 18, 2005

(87) PCT Pub. No.: WO2004/048296

PCT Pub. Date: Jun. 10, 2004

(65) Prior Publication Data
US 2006/0048871 A1    Mar. 9, 2006

(30) Foreign Application Priority Data
Nov. 22, 2002    (JP) .............................. 2002-338802

(51) Int. Cl.
C06B 45/00 (2006.01)
C06B 45/10 (2006.01)
D03D 23/00 (2006.01)
D03D 43/00 (2006.01)

(52) U.S. Cl. ................. 149/19.7; 149/2; 149/108.4; 149/109.4; 149/109.6

(58) Field of Classification Search .............. 149/2, 149/19.7, 108.6, 109.4, 109.6
See application file for complete search history.

(56) References Cited

U.S. PATENT DOCUMENTS
2006/0162607 A1 * 7/2006 Kodama et al. ............. 102/530

FOREIGN PATENT DOCUMENTS

| EP | 0 795 528 | 9/1997 |
| EP | 1 118 512 | 7/2001 |
| JP | 10-87390 | 4/1998 |
| JP | H10-87390 | * 4/1998 |

(Continued)

*Primary Examiner*—J A Lorengo
*Assistant Examiner*—James E McDonough
(74) *Attorney, Agent, or Firm*—Oblon, Spivak, McClelland, Maier & Neustadt, P.C.

(57) ABSTRACT

There is provided a tubular molded article of a gas generating agent consisting of a non-azide-based composition. Both ends of the molded article are squashed. A gas-generating-agent producing process is to obtain a gas generating agent which is molded into the form of a tube both ends of which are squashed in such a way that the tubular molded article of the gas generating agent being in a wetted state is passed through a gap between a pair of molding gears that are rotatable so that each convex tooth of one of the molding gears can face that of the other molding gear, thereafter the molded article is squashed with the convex teeth at predetermined intervals, thereafter the molded article is cut off at the squashed concave parts in such a way as to be folded, and the resultant cut pieces are dried.

16 Claims, 6 Drawing Sheets

FOREIGN PATENT DOCUMENTS

| | | |
|---|---|---|
| JP | 2000-239092 | 9/2000 |
| JP | 2000-319086 | 11/2000 |
| KR | 2000-0052990 | 8/2000 |
| WO | WO 98/22208 | 5/1998 |

* cited by examiner

Fig. 7

| | Length of molded article of gas generating agent L(mm) | L/d (d: Spatial inner diameter (mm)) | Compression strength K(kgf) | Filling density ρ (g/ml) | Time from ignition to start-up t1(ms) | Time from start-up to attainment of tank maximum pressure T(ms) | Tank maximum pressure P(kPa) |
|---|---|---|---|---|---|---|---|
| Example 1 | 4.4 | 9 | 9.3 | 1.117 | 2.1 | 68 | 190 |
| Example 1 | 4.4 | 5.5 | 7.4 | 1.069 | 2.0 | 70 | 200 |
| Comparative example 1 | 4.4 | 9 | 8.5 | 1.080 | 1.5 | 62 | 195 |
| Comparative example 2 | 4.4 | 5.5 | 6.6 | 1.047 | 1.5 | 65 | 210 |

GAS GENERATING AGENT, PROCESS FOR PRODUCTION THEREOF, AND GAS GENERATOR FOR AIR BAGS

TECHNICAL FIELD

This invention relates to a gas generating agent that generates gaseous components by being burnt to inflate an air bag, a process for producing the gas generating agent, and an air-bag gas generator that uses the gas generating agent.

BACKGROUND ART

Generally, a gas generating composition used in a vehicular safety device contains fuel components and oxidizing agents. For example, phase-stabilized ammonium nitrate is used as an oxidizing agent, and triaminoguanidine nitrate (hereinafter, referred to simply as TAGN) and a combination of TAGN and guanidine nitrate are used as fuel components (see Patent Document 1: U.S. Pat. No. 5,783,773, for example). There is also a composition in which guanidine nitrate/nitroguanidine is used as a fuel component and in which perchlorate is used as a main substance of an oxidizing agent (see Patent Document 2: U.S. Pat. No. 5,780,768, for example). These compositions are to obtain a preferred combustion rate by combining a component having high reactivity, such as TAGN or perchlorate, with an oxidizing agent and a fuel each of which has inherently low reactivity. However, since the amount of heat generated by the combustion of the compositions rises on the other hand, these gas-generating agents are hardly suitable for a gas generator. There is also a compound being used as a fuel and containing oxygen atoms of 25% or more in an atomic weight ratio in the molecule, and is a combination of a metallic oxide and a plural metallic oxide (i.e., an oxide having a plurality of kinds of metallic components) (see Patent Document 3: Japanese Published Unexamined Patent Application No. 2000-86375, for example). Although the combustion temperature is designed to be low in this composition, the number of gas-generating moles is unsatisfactory because the metallic oxides are used as oxidizing agents. If the number of moles of a gas generated necessary to inflate an air bag is intended to be secured, the amount of gas-generating agents to be used will increase, and, as a result, the amount of heat generated by the combustion of the gas generating agents will increase. In other words, since a large amount of coolant is needed in the gas generator using these compositions, it is difficult to achieve a reduction in size and weight of the gas generator.

A molded article of a gas generating agent that can exhibit a high combustion performance even if its heat value is controlled to be low is shown to solve the above-mentioned problem (see Patent Document 4: Japanese Published Unexamined Patent Application No. H10-87390, for example). This molded article is produced by molding a gas generating agent to be shaped like a cylindrical tube, and is burnt simultaneously from the outer surface of the gas generating agent and from the inner surface of the through-hole so as to burn the agent with high efficiency, and hence is capable of exhibiting a high combustion performance while restricting the amount of heat generated by its combustion. As a result, this publication (Patent Document 4) asserts that a gas generator can be reduced in size and weight. There are also Patent Document 5 (Japanese Published Unexamined Patent Application No. 2000-239092) and Patent Document 6 (Japanese Published Unexamined Patent Application No. 2000-319086), each disclosing a molded article of a gas generating agent that has a recessed portion on the surface thereof.

Generally, a gas generating agent used in a gas generator for air bags is required to instantaneously inflate and expand an air bag when a collision or a similar accident occurs. In this respect, the gas generator that uses a molded article of a gas generating agent that is disclosed in Patent Document 4 (Japanese Published Unexamined Patent Application No. H10-87390) can exhibit a high combustion performance, and therefore can instantaneously inflate and expand an air bag. However, there is a fear that the air bag will adversely affect passengers because of the inflating shock of the air bag when the air bag is rapidly inflated at the beginning of the expansion thereof. If so, the air bag may be incapable of fulfilling its function as a device used to ensure the safety of vehicle occupants. Therefore, an ideal gas generating agent used in an air-bag gas generator is regarded as gradually inflating an air bag at the beginning of its expansion and then rapidly inflating it. In other words, a gas generating agent by which the pressure in a gas generator varies like the letter S with the passage of time is required as a gas generating agent capable of improving the safety of passengers.

DISCLOSURE OF INVENTION

It is an object of the present invention to provide a gas generating agent, which is formed with non-azide-based compositions, which restricts its heat value, which exhibits a high combustion performance, and which is gradually burnt at the beginning of combustion and then rapidly burnt, provide a process for producing the gas generating agent, and provide an air-bag gas generator that uses the gas generating agent.

In order to solve the above-mentioned problems, the present inventors have carried out diligent investigations into such a gas generating agent, a process for producing the agent, and an air-bag gas generator using the agent, and, as a result, have achieved completion of the present invention.

In more detail, the present invention is a gas generating agent wherein a tubular molded article of the gas generating agent is formed with non-azide-based compositions and in that both ends thereof are molded to be squashed. Additionally, the present invention is an air-bag gas generator that uses the gas generating agent.

Since the gas generating agent of the present invention is molded so as to squash both ends thereof, both ends thereof are first ignited and are mildly burnt at the beginning of combustion. After that, the gas generating agent can be rapidly burnt simultaneously from the outer surface of the tube portion and from the inner surface of the inside of the tube portion. Therefore, the gas generating agent is suitable to be used in a gas generator for air bags.

A gas-generating-agent producing process of the present invention is to obtain a gas generating agent which is molded into the form of a tube both ends of which are squashed in such a way that the tubular molded article of the gas generating agent being in a wetted state is passed through a space between a pair of molding gears that are rotatable so that each convex tooth of one of the molding gears can face that of the other molding gear, thereafter the molded article is squashed with the convex teeth at predetermined intervals, thereafter the molded article is bent and cut at the squashed concave parts, and the resultant cut pieces are dried.

Another gas-generating-agent producing process of the present invention is to obtain a gas generating agent in such a way that the tubular molded article of the gas generating agent being in a wetted state is passed through a space between a pair of molding gears that are rotatable so that each convex tooth of one of the molding gears can face that of the other molding gear, thereafter the molded article is squashed with the convex teeth at predetermined intervals, and the molded article is dried and cut off. Preferably, in this process, both ends of the molded article are squashed. Preferably, the molded article is cut while being bent at the squashed concave parts, and is sifted.

BRIEF DESCRIPTION OF DRAWINGS

FIG. 7 is a table that shows test conditions and results of the tank combustion test of the gas generating agent according to the present invention.

BEST MODE FOR CARRYING OUT THE INVENTION

Figure 1:
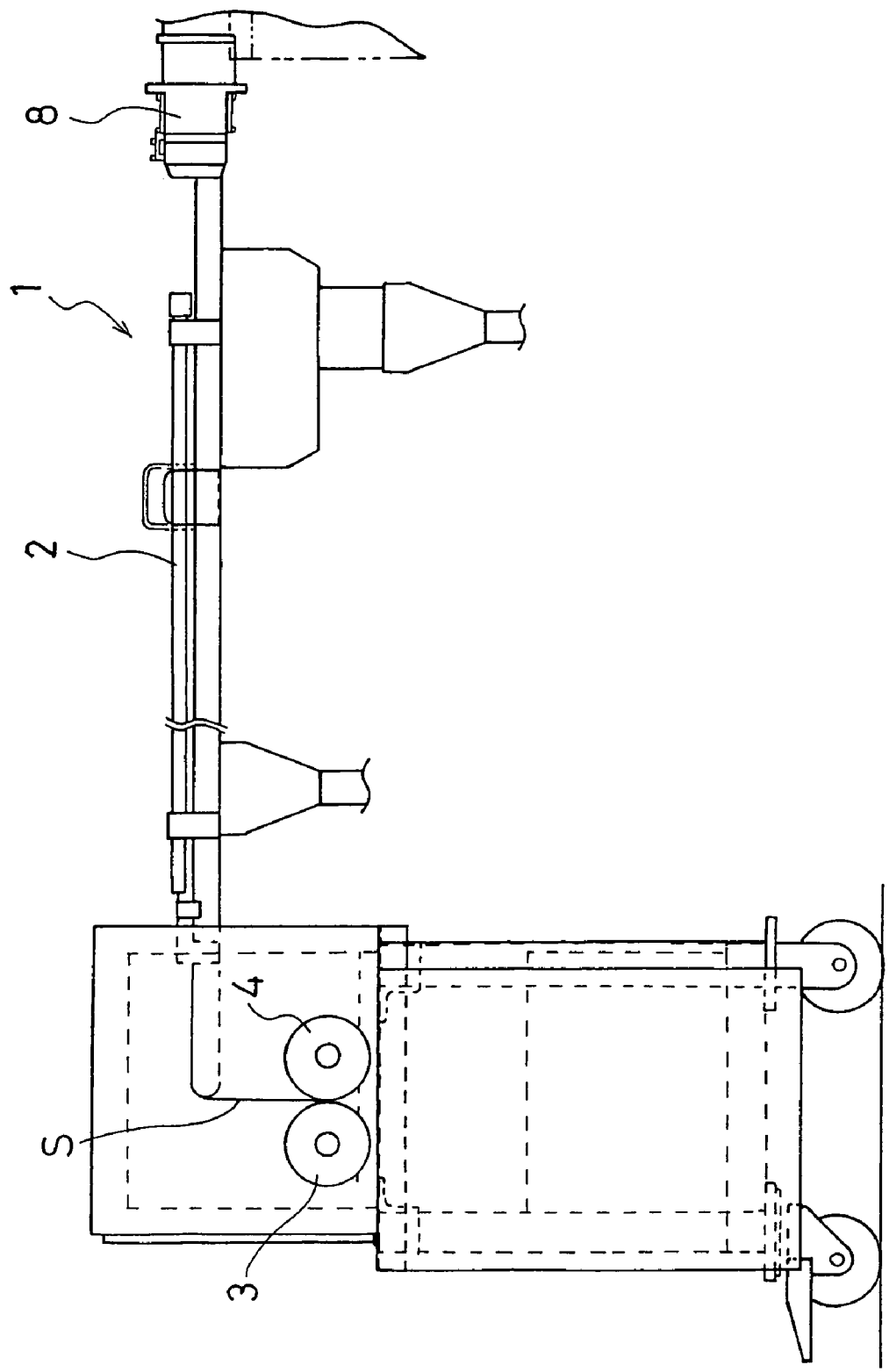
FIG. 1 is a schematic view of a main part of an apparatus for producing a gas generating agent according to the present invention.

This embodiment is concerned with a gas generating agent characterized by being a tubular molded article of the gas generating agent formed with non-azide-based compositions and being molded in a state in which both ends of the tubular molded article are squashed.

In this embodiment, a non-azide-based composition is normally composed of a nitrogen-containing organic compound, an oxidizing agent, a slag forming agent, and a binder.

In this embodiment, a "molded article" means an element that has been processed to have a predetermined shape by using a mold. An extrusion molding material is put into a mold formed between an outer diameter and an inner diameter and is extruded therefrom. The extrusion molding material is then put into a mold formed by convex parts of gears that face each other so that a molded article has concave parts.

In this embodiment, the outer diameter D of the above-mentioned molded article is preferably from 1.4 mm to 4 mm, the length L thereof is preferably from 1.5 mm to 8 mm, and the inner diameter d of the inside of the molded article is preferably from 0.3 mm to 1.2 mm. More preferably, the outer diameter D of the molded article is from 1.5 mm to 3.5 mm, the length L thereof is from 2 mm to 6 mm, and the inner diameter d of the inside of the molded article is from 0.5 mm to 1.2 mm. Even if a gas generating agent is molded so as to squash both ends thereof, the gas generating agent can have a combustion rate similar to that of the conventional hollow gas generating agent not having both squashed ends (see Patent Document 4: Japanese Published Unexamined Patent Application No. H10-87390).

A state in which both ends of a molded article of a gas generating agent are squashed means a state in which openings at both ends of the molded article are squashed by two forces applied from the outside to the inside. It is permissible that the openings are either in a state of being completely closed or in a state of being not completely closed.

Preferably, in this embodiment, the gas generating agent is prepared so that a tank maximum pressure P (kPa) is from 50 kPa to 700 kPa in a tank combustion test conducted in examples described later. More preferably, the tank maximum pressure P (kPa) is from 50 kPa to 500 kPa.

Preferably, in this embodiment, the gas generating agent is prepared so that time T (ms) taken from the start-up of a tank pressure to its arrival at a tank maximum pressure P (kPa) is from 20 ms to 100 ms in a tank combustion test conducted in examples described later, and a pressure-time curve is traced like the letter S.

Generally, a nitrogen-containing organic compound usable as a fuel for a gas generating agent used in an air-bag gas generator, such as one kind or two or more kinds selected from the group consisting of tetrazole derivatives, guanidine derivatives, triazole derivatives, azodicarbonamide derivatives, and hydrazine derivatives, can be used as the nitrogen-containing organic compound used in this embodiment. For example, tetrazole, 5-aminotetrazole, and 5,5'-bi-1H-tetrazole can be mentioned as the tetrazole derivatives. For example, guanidine, nitroguanidine, cyanoguanidine, guanidine nitrate, and guanidine carbonate can be mentioned as the guanidine derivatives. The content of a nitrogen-containing organic compound in a gas generating composition depends on the type of oxidizing agent, the type of additive, or the oxygen balance, and is preferably from 32.5% by weight to 60% by weight. In order to adjust the amount of heat per 1 mol of a gas generated by the combustion of the gas generating composition to be below 125 kJ, preferably below 115 kJ, and in order to adjust the number of moles for a gas generated to be above 2.70 moles per 100 grams, it is preferable to use one kind selected from the group consisting of guanidine nitrate, nitroguanidine, and 5-aminotetrazole as the nitrogen-containing organic compound. Especially, guanidine nitrate is relatively low in cost, and has a melting point higher than 200° C., and hence is extremely stable from a thermal point of view. Additionally, guanidine nitrate is excellent from the point of view of environmental resistance, thus being suitable for a gas generating agent. Additionally, since these compounds have oxygen atoms in the molecule and do not need to have a large amount of oxidizing agents for perfect combustion, a high number of moles generated can be expected. Additionally, these compounds have a high negative standard enthalpy change of formation ΔHf, and, as a result, the amount of energy released during the combustion of the gas generating composition is small. Therefore, the combustion temperature of the gaseous compounds can be controlled to be low.

The 50% mean particle diameter of the nitrogen-containing organic compound is preferably from 5 μm to 80 μm, and more preferably from 10 μm to 50 μm because, if the diameter is too large, the strength will become low when a molded article of the gas generating agent is formed therewith, and, if the diameter is too small, high costs will be needed to crush the molded article. In this description, the "50% mean particle diameter" means the mean particle diameter of 50% based on the number thereof.

Generally, an oxidizing agent usable for a gas generating agent used in an air-bag gas generator can be used as the oxidizing agent used in this embodiment. The content of the oxidizing agent in a gas generating composition in this embodiment depends on the type of nitrogen-containing organic compound, the type of additive, or the oxygen balance, and is preferably from 35% by weight to 65% by weight. In order to adjust the amount of heat per 1 mol of a gas generated by combustion of the gas generating composition to be below 125 kJ, preferably below 115 kJ, and in order to adjust the number of moles for a gas generated to be above 2.70 moles per 100 grams, it is preferable to, as the oxidizing agent, use one or more kinds selected from the group consisting of phase-stabilized ammonium nitrate; ammonium perchlorate; basic metal nitrate; any one of alkali metal nitrate, alkali metal perchlorate, and alkali metal chlorate; and any one of alkali earth metal nitrate, alkali earth metal perchlorate, and alkali earth metal chlorate. From the point of view of easiness in performance adjustment, it is particularly preferable to use a mixed oxidizing agent obtained by mixing two or more kinds selected from the above-mentioned group together. Phase-stabilized ammonium nitrate will be described here. Ammonium nitrate is inferior in thermal stability, and causes a volumetric change due to phase transition depending on the temperature. Especially, phase transition occurring at about 32° C. is large in volumetric change. Therefore, there is a fear that the strength of the gas generating agent will be lowered, and fire behavior will vary if an excess and fall from this temperature is repeatedly performed. In order to overcome this fear, about a 10% potassium salt (for example, potassium nitrate) that contains oxygen atoms is added and mixed to prevent the phase transition. This is called "phase-stabilized ammonium nitrate." Basic copper nitrate and the like can be mentioned as a basic metal nitrate. Sodium nitrate, potassium nitrate, strontium nitrate, etc., can be mentioned as an alkali metal nitrate. Sodium perchlorate, potassium perchlorate, strontium perchlorate, etc., can be mentioned as an alkali metal perchlorate. Sodium chlorate, potassium chlorate, strontium chlorate, etc., can be mentioned as an alkali metal chlorate. Magnesium nitrate, calcium nitrate, barium nitrate, etc., can be mentioned as an alkali earth metal nitrate. Magnesium perchlorate, calcium perchlorate, barium perchlorate, etc., can be mentioned as an alkali earth metal perchlorate. Magnesium chlorate, calcium chlorate, barium chlorate, etc., can be mentioned as an alkali earth metal chlorate.

Preferably, a mixed oxidizing agent contains one or more kinds selected from the group consisting of strontium nitrate, basic copper nitrate, and phase-stabilized ammonium nitrate, in order to exclude a solid component of a gas generated so as to improve combustibility when the mixed oxidizing agent is used as an oxidizing agent. Further, it is preferable to prepare the mixed oxidizing agent from two or three kinds selected from the group consisting of strontium nitrate, basic copper nitrate, and phase-stabilized ammonium nitrate. A more appropriate combustion rate can be obtained as a gas generating agent by using the strontium nitrate for a part of the mixed oxidizing agent. A combustion residue of strontium nitrate can be turned into an easily filtrated product by undergoing a slag forming reaction to a silicon-containing compound (for example, silicon carbide, silicon dioxide, silicate, or silane compounds) or to metallic oxide (for example, iron oxide), so that a solid component in a gas generation can be excluded.

Likewise, it is preferable to allow the mixed oxidizing agent to contain at least one kind selected from the group consisting of a basic copper nitrate, alkali earth metal nitrate, and phase-stabilized ammonium nitrate.

If basic copper nitrate is used as part of the mixed oxidizing agent, the ignitability of the gas generating composition can be improved. Generally, a gas generating agent is ignited by an ignitor and a priming charge. A gas generating agent inferior in ignitability necessarily results in the use of a large amount of priming charges that have a large heat value, and the gross heat value for each gas generator increases. Therefore, the gas generator cannot be reduced in size and weight. Furthermore, a combustion residue produced when basic copper nitrate is burnt is a molten $Cu_2O$ (melting point: 1232° C.)/Cu (melting point: 1083° C.) mist, but is a compound having a high melting point. Therefore, the combustion residue can be easily removed by a cooling member of the gas generator. The combustion residue can be more easily removed by coexisting with the slag forming reaction of strontium nitrate described later. Also in this respect, the use of the mixed oxidizing agent is effective.

Additionally, it is extremely useful to use phase-stabilized ammonium nitrate for part of the mixed oxidizing agent. The reason is that the use of phase-stabilized ammonium nitrate is effective in raising the number of moles of a gas generated and in raising the combustion rate.

The type that uses phase-stabilized ammonium nitrate brings danger in production by being combined with a highly reactive component such as TAGN disclosed in Patent Document 1 (U.S. Pat. No. 5,783,773). Therefore, it is preferable to use nitrogen-containing organic compounds other than TAGN when phase-stabilized ammonium nitrate is used, but a combination of TAGN and phase-stabilized ammonium nitrate can be used as a safe gas generating composition, depending on the other oxidizing agents, the other nitrogen-containing organic compounds, or an additive to be used.

A method for stabilizing the phase of phase-stabilized ammonium nitrate usable in this embodiment is not limited to a specific one, and a method for adding a potassium salt to ammonium nitrate can be mentioned as a well-known technique. In this embodiment, a small amount of potassium perchlorate, a small amount of potassium nitrate, a small amount of potassium chlorate, a small amount of potassium nitrite, a small amount of potassium sulfate, a small amount of potassium chloride, and a small amount of potassium oxalate are added to potassium nitrate, and are then added to ammonium nitrate. As a result, ammonium nitrate whose phase has been stabilized is preferable. Ammonium nitrate whose phase is stabilized by potassium perchlorate or potassium nitrate is particularly preferable from the point of view of thermal stability, oxidizability, etc. The amount of addition of these potassium salts to ammonium nitrate is from 1% by weight to 30% by weight, more preferably from 1% by weight to 15% by weight. A metal complex, such as a diammine metal complex, can be used as a phase stabilizing agent. If the diammine metal complex is used, desirable metallic components are copper, nickel, and zinc.

The amount of phase-stabilized ammonium nitrate used as a mixed oxidizing agent that is contained in a gas generating composition is preferably from 35% by weight to 65% by weight, depending on a nitrogen-containing organic compound, on the kind of additive, or on oxygen balance. If ammonium nitrate whose phase is stabilized by use of a potassium salt is used, potassium oxide, potassium carbonate, or potassium chloride, each having a low melting point and a low boiling point, is generated resulting from the combustion of a gas generating agent. These compounds have an extreme difficulty in being filtrated with a filter disposed in a gas generator, and there is a fear that these compounds will flow out from the gas generator to the outside so as to damage a bag, and hence it is preferable to design the amount of phase-stabilized ammonium nitrate contained in a gas generating composition to fall within the above-mentioned range.

If the mean particle diameter of the oxidizing agent is too large, the strength will be lowered when a molded article of the gas generating agent is formed, and, if the diameter is too small, great costs will be needed to crush the molded article. Therefore, the 50% mean particle diameter thereof is preferably from 5 μm to 80 μm, more preferably from 10 μm to 50 μm.

Generally, a slag forming agent usable as an additive for a gas generating agent used in the air-bag gas generator can be used as the slag forming agent used in this embodiment. For example, clay mineral (for example, acid clay, kaolin, or talc), silicon nitride, silicon carbide, silicon dioxide, silicate, silica, silane compounds, etc., can be mentioned as concrete examples. In this embodiment, it is preferable to employ a clay mineral or a silane compound.

In the present invention, clay mineral usable as a slag forming agent is composed chiefly of aluminum silicate. Aluminum silicate is an inorganic silicon compound, which has the structure of $xAl_2O_3.ySiO_2.zH_2O$. Clay mineral known as acid clay, or the like, is preferred. The amount of acid clay contained in the gas generating composition of the present invention is normally from 0.1% by weight to 15% by weight, preferably from 0.5% by weight to 10% by weight, more preferably from 0.5% by weight to 8% by weight. If the amount of acid clay contained therein exceeds this range, the heat value of the gas generating agent will increase, and hence there exists the possibility that the object of the present invention cannot be achieved. If the amount thereof is below this range, a combustion residue produced from the burning reaction of strontium nitrate will be made fine. Therefore, the combustion residue cannot be caught by the filter of the gas generator, and there arises the fear that the residue will flow out from the gas generator so as to damage a bag or the like, and hence there exists the possibility that the object of the present invention cannot be achieved. The combustion residue produced from the burning reaction of strontium nitrate is changed into a compound that can be easily filtrated with the filter of the gas generator by allowing acid clay to be contained in the gas generating composition of the present invention. Additionally, the containing of acid clay is effective in ensuring the strength of a molded article and in raising a combustion rate.

The silane compound usable as a slag forming agent in this embodiment is an organosilicon compound, and it is preferable to use a silane compound known as a silane coupling agent such as vinylsilane, epoxysilane, acrylsilane, or aminosilane. The amount of the silane compound contained in the gas generating composition of this embodiment is normally from 0.1% by weight to 15% by weight, preferably from 0.5% by weight to 10% by weight, more preferably from 0.5% by weight to 8% by weight. If the amount of the silane compound contained therein exceeds this range, the combustion temperature will rise, and there is a fear that nitrogen oxides that bring harm to a person will be produced. Furthermore, since the heat value of the gas generating agent is raised, there exists the possibility that the object of this embodiment cannot be achieved. By containing the silane coupling agent in the gas generating composition of this embodiment, a combustion residue produced from the burning reaction of strontium nitrate is changed into a compound that can be easily filtrated with the filter of the gas generator. Additionally, the containing of the silane coupling agent is effective in securing the strength of a resulting molded article and in raising the combustion rate.

Generally, a binder usable as an additive for the gas generating agent used in the air-bag gas generator can be used as a binder usable in this embodiment. For example, synthetic hydrotalcite, acid clay, talc, bentonite, diatom earth, molybdenum disulfide, crystalline cellulose, graphite, magnesium stearate, and calcium stearate can be mentioned as specific binders. Additionally, sodium salts of carboxymethyl cellulose, methyl cellulose, hydroxyethyl cellulose, hydroxypropyl cellulose, hydroxypropyl methylcellulose, polyvinyl alcohol, guar gum, poly vinylpyrrolidone, polyacrylamide, and a mixture of these compounds can be mentioned as specific binders. When extrusion molding, which will be described later, is performed as in the present invention, moldability is improved by adding these binders and a lubricant (for example, graphite or a silane coupling agent), a surface-active agent, or molybdenum disulfide at a rate ranging from 0.5% by weight to 5% by weight. The amount of binders contained in the gas generating composition of this embodiment is preferably from 0.1% by weight to 15% by weight, more preferably from 0.5% by weight to 10% by weight, particularly preferably from 1% by weight to 5% by weight. If the amount of binders contained therein exceeds this range, the combustion rate will be lowered, and the number of moles of a gas generated will be lowered. Therefore, there is a fear that a function for cushioning the vehicle occupants cannot be satisfactorily fulfilled. If the amount of binders contained therein is below this range, there is a fear that environmental resistance performance will be lowered.

A combustion adjusting agent can be further used as an additive in this embodiment. A substance capable of adjusting the combustion of a gas generating agent is recommended as the combustion adjusting agent usable herein. Metallic oxide, such as iron oxide, nickel oxide, copper oxide, zinc oxide, manganese oxide, chrome oxide, cobalt oxide, molybdenum oxide, vanadium oxide, or tungsten oxide; metallic hydroxide, such as copper hydroxide, cobalt hydroxide, zinc hydroxide, or aluminum hydroxide; and a carbon-based substance, such as active carbon powder, graphite, or carbon black, can be mentioned as specific ones. The amount of the combustion adjusting agent contained in the gas generating composition center is preferably from 0 to 10% by weight, more preferably from 0 to 5% by weight.

Next, a description will be given of concrete examples of a preferred combination in this embodiment. It is preferable to use a gas generating agent in which the above-mentioned nitrogen-containing organic compound consists of any one kind of guanidine nitrate, nitroguanidine, and 5-aminotetrazole, in which the above-mentioned oxidizing agent consists of any one kind of or a combination of two or more kinds of strontium nitrate, basic copper nitrate, phase-stabilized ammonium nitrate, potassium nitrate, and ammonium perchlorate, in which the above-mentioned slag forming agent consists of any one kind of silica, acid clay, and silicon nitride, and in which the above-mentioned binder consists of any one kind of or a combination of two or more kinds of hydroxypropyl methylcellulose, poly vinylpyrrolidone, and polyacrylamide. Preferably, the nitrogen-containing organic compound contains guanidine nitrate ranging from 32.5% by weight to 60% by weight, the oxidizing agent contains strontium nitrate or basic copper nitrate ranging from 35% by weight to 65% by weight, the slag forming agent contains acid clay ranging from 0.5% by weight to 15% by weight, and the binder contains any one kind of polyacrylamide, hydroxypropyl methylcellulose, and poly vinylpyrrolidone ranging from 0.5% by weight to 15% by weight. Preferably, the non-azide-based composition usable in this embodiment contains a nitrogen-containing organic compound ranging from 32.5% by weight to 60% by weight, an oxidizing agent ranging from 35% by weight to 65% by weight, a slag forming agent ranging from 0.5% by weight to 15% by weight, and a binder ranging from 0.5% by weight to 15% by weight. Preferably, the non-azide-based composition contains guanidine nitrate for the nitrogen-containing organic compound and contains at least two kinds selected from the group consisting of strontium nitrate, basic copper nitrate, and phase-stabilized ammo nium nitrate for the oxidizing agent. In more detail, preferred combinations are as follows.

(1) Guanidine nitrate: from 32.5% by weight to 60% by weight
Strontium nitrate: from 12% by weight to 50% by weight
Basic copper nitrate: from 1% by weight to 30% by weight (preferably, from 12% by weight to 30% by weight)
Additive: residue (preferably, from 0.5% by weight to 15% by weight)

(2) Guanidine nitrate: from 32.5% by weight to 60% by weight
Strontium nitrate: from 12% by weight to 50% by weight
Basic copper nitrate: from 1% by weight to 30% by weight
Phase-stabilized ammonium nitrate: from 1% by weight to 30% by weight
Additive: residue (preferably, from 0.5% by weight to 15% by weight)

Preferably, a combination of a silane coupling agent and synthetic hydrotalcite, a combination of a binder for extrusion molding and a lubricant, or acid clay is used as the additive. Preferred combinations using these are as follows.

(1) Guanidine nitrate: from 32.5% by weight to 60% by weight
Strontium nitrate: from 12% by weight to 50% by weight
Basic copper nitrate: from 1% by weight to 30% by weight
Acid clay: from 0.5% by weight to 15% by weight
Polyacrylamide: from 0.5% by weight to 15% by weight (2) Guanidine nitrate: from 32.5% by weight to 60% by weight
Strontium nitrate: from 12% by weight to 50% by weight
Basic copper nitrate: from 1% by weight to 30% by weight
Acid clay: from 0.5% by weight to 15% by weight
Hydroxypropyl methylcellulose: from 0.5% by weight to 15% by weight (3) Guanidine nitrate: from 32.5% by weight to 60% by weight
Strontium nitrate: from 12% by weight to 50% by weight
Basic copper nitrate: from 1% by weight to 30% by weight (preferably, from 1% by weight to 20% by weight)
Phase-stabilized ammonium nitrate: from 1% by weight to 30% by weight
Acid clay: from 0.5% by weight to 15% by weight
Poly vinylpyrrolidone: from 0.5% by weight to 15% by weight (4) Guanidine nitrate: from 32.5% by weight to 60% by weight
Strontium nitrate: from 12% by weight to 50% by weight
Basic copper nitrate: from 1% by weight to 30% by weight
Binder for extrusion molding: from 0.5% by weight to 15% by weight
Lubricant: from 0% by weight to 5% by weight (5) Guanidine nitrate: from 32.5% by weight to 60% by weight
Strontium nitrate: from 12% by weight to 50% by weight
Basic copper nitrate: from 1% by weight to 30% by weight
Binder: from 0.5% by weight to 15% by weight
Acid clay: from 1% by weight to 5% by weight
Graphite: from 0.2% by weight to 5% by weight Normally, time taken from the ignition of the gas generating agent of this embodiment to start-up ranges from 1.0 ms to 5.0 ms, preferably from 1.7 ms to 5.0 ms.

Next, a description will be given of an example of a process for producing the gas generating agent of this embodiment. First, the non-azide-based composition composed of the above-mentioned nitrogen-containing organic compound, the oxidizing agent, the slag forming agent, the binder, etc., is mixed by use of a V-type mixer, a rocking mixer, or a ball mill. A silane coupling agent proper in quantity is then added to the composition, and is mixed while adding water or a solvent (for example, ethanol). As a result, a wet mixture pressed into a lump is obtained. Herein, the "wet" state means a state of having plasticity to some degree and containing water or a solvent of preferably from 10% to 25%, more preferably from 13% to 18%. It is permissible to pre-mix the silane coupling agent with water or a solvent and then add the resulting mixture. At this time, a chemical linkage occurs among the nitrogen-containing organic compound, the oxidizing agent, and the silane coupling agent, and a bonding force thereamong is raised. After that, the wet mixture pressed into a lump is put into an extrusion molding machine (for example, a molding machine provided with a die and a pin for an inside hole at its outlet) without any change for extrusion molding, and is molded into a hollow cylindrical molded article whose outer diameter D is preferably from 1.4 mm to 4 mm, more preferably from 1.5 mm to 3.5 mm and whose spatial inner diameter d is preferably from 0.3 mm to 1.2 mm, more preferably from 0.5 mm to 1.2 mm.

Thereafter, as shown in FIG. 1, the hollow cylindrical molded article extruded from the extrusion molding machine 8 is sent between a pair of molding gears 3 and 4 without being dried in air while being drawn by means of a drawing belt 2 of a rotary cutter 1 shown in FIG. 1. The molding gears 3 and 4 are rotated in mutually opposite directions so as to push the molded article S downward and are rotated so that convex teeth formed on the surfaces of the gears 3 and 4 face each other, thus forming the molded article S having squashed-parts at equal intervals. Accordingly, the resulting molded article S is squashed at equal intervals.

Figure 2:
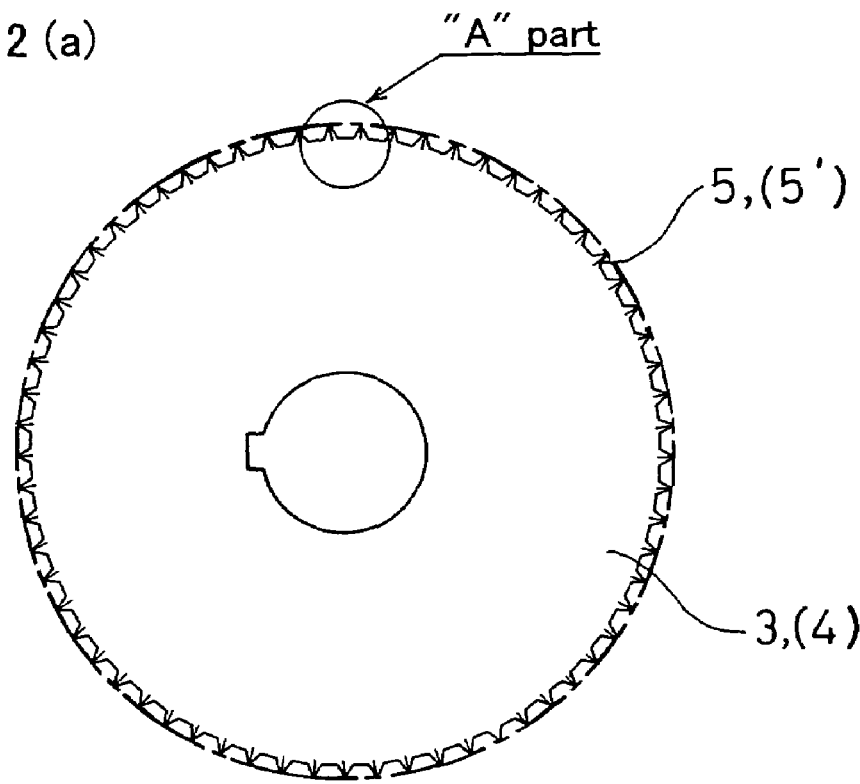
FIG. 2(a) is an enlarged front view of a molding gear of the apparatus of FIG. 1.
FIG. 2(b) is an enlarged side view of the molding gear of the apparatus of FIG. 1.
Figure 2:
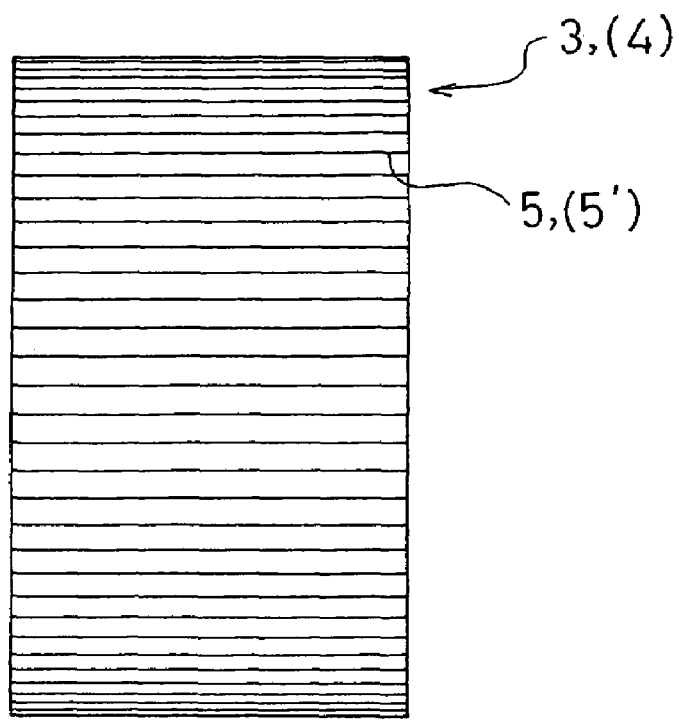
Figure 3:
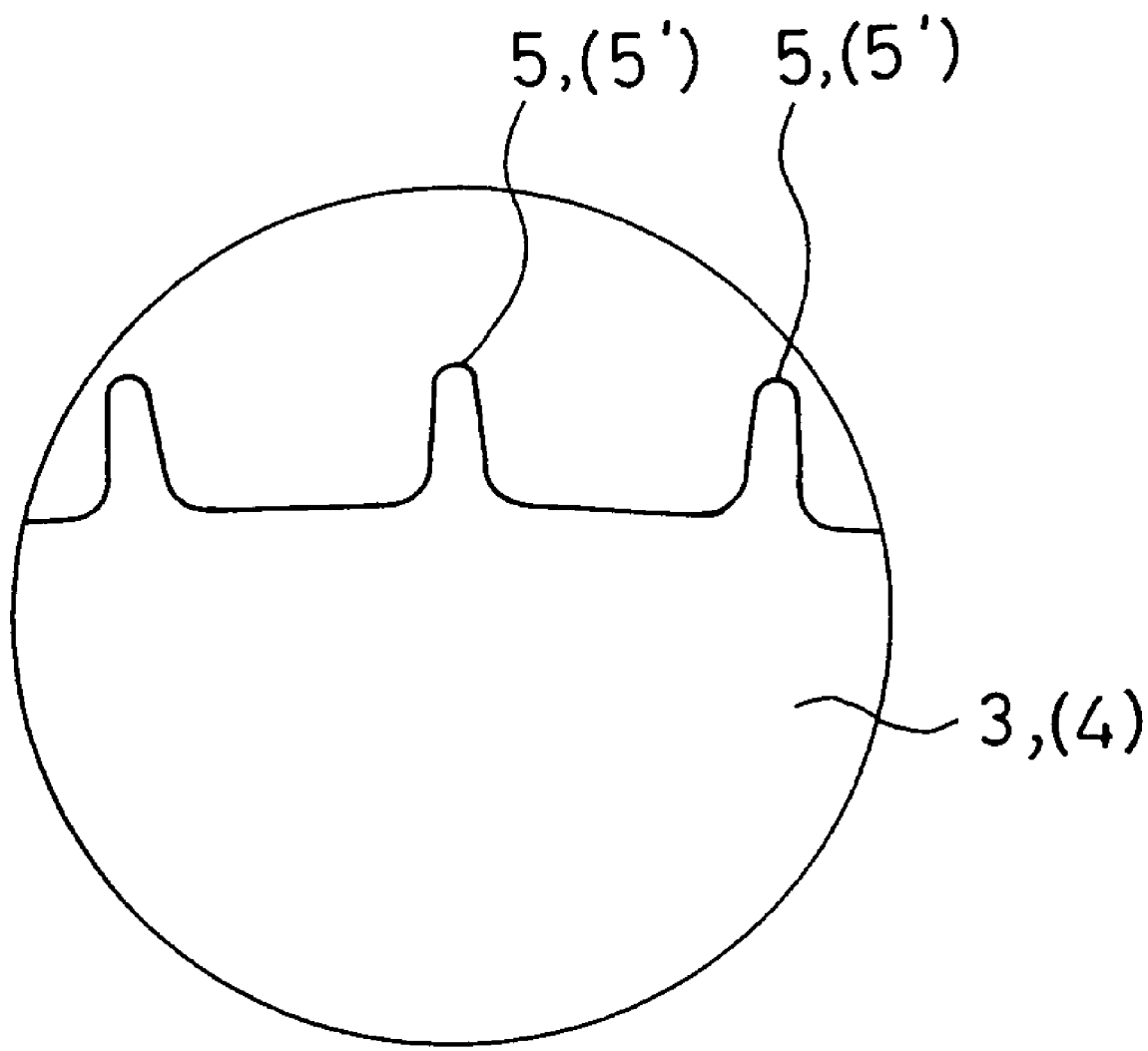
FIG. 3 is an enlarged view of an "A" part shown in FIG. 2(a).

As shown in FIG. 2(a), the molding gear 3 (4) has convex teeth 5 (5') arranged at equal intervals on its surface. As shown in FIG. 3, which is an enlarged view of "A" part in FIG. 2(a), each convex tooth 5 is formed to be thin and acute so that squashed parts of the molded article S become small.

Figure 4:
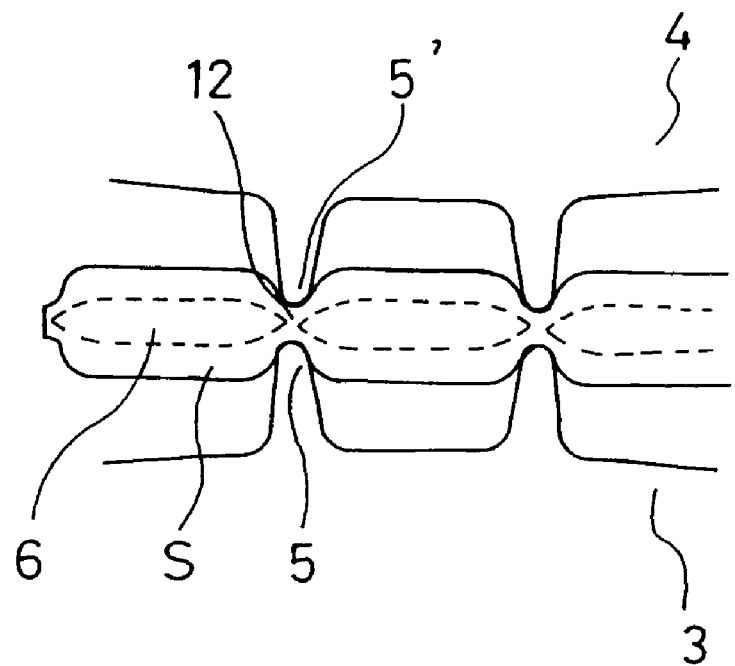
FIG. 4 is a view for explaining a situation in which the gas generating agent according to the present invention is molded.

As shown in FIG. 4, the molding gears 3 and 4 are disposed so that a slight gap is created between the molding gears 3 and 4 in a state in which the convex teeth 5 and 5' formed on the surfaces of the molding gears 3 and 4 are butted against each other. This makes it possible to form a squashed concave part 12 while holding a space 6 inside without allowing the molded article S to be cut off by the molding gears 3 and 4 when the molded article S passes through the gap between the molding gears 3 and 4. One condition for forming the squashed concave part 12 without being cut off as shown in FIG. 4 is to pass the molded article S, which is soft, between the molding gears 3 and 4 without drying the molded article S, which has undergone extrusion molding, in air.

Figure 5:
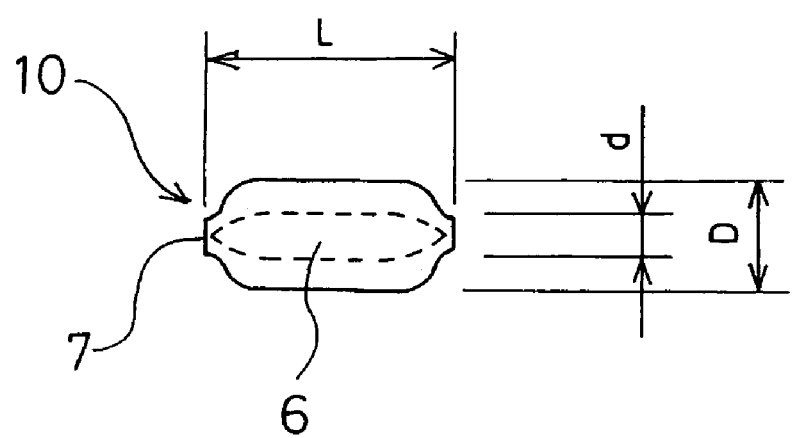
FIG. 5 shows an example of the gas generating agent according to the present invention.

After being cut off in such a way as to be folded at each squashed concave part 12, the molded article S is dried through two stages, i.e., is dried normally at a temperature of 50° C. to 60° C. for 4 to 10 hours and is then dried normally at a temperature of 105° C. to 120° C. for 6 to 10 hours. As a result, a tubular gas-generating agent 10 whose interior has a space 6 in a state in which an end part 7 has been squashed can be obtained as shown in FIG. 5.

Such a gas generating agent 10 can be obtained by another method. In detail, the resulting molded article S is dried through two stages, i.e., is dried preferably at a temperature of 50° C. to 60° C. for 4 to 10 hours and is then dried preferably at a temperature of 105° C. to 120° C. for 6 to 10 hours. After being dried, a ball used to fold the molded article S is put into a V-type mixer, a ball mill, or a rocking mixer together with the molded article S, and these are mixed for 3 to 60 minutes so as to fold the molded article S. The ball mentioned here to fold the molded article S is a metal, such as iron, that has a specific gravity of 1.0 to 8.0 and that is covered with Teflon or resin. After being cut off in such a way as to be folded at each squashed concave part 12, classification is performed. As a result, a tubular gas generating agent 10 whose interior has a space 6 in a state in which an end part 7 has been squashed can be obtained as shown in FIG. 5.

Preferably, the gas generating agent 10 has a length of 1.5 mm to 8 mm. The fracture surface of the end part 7 is roughened by being cut off in such a way as to be folded. As a result, a larger surface area can be obtained, and inflammability is improved, and therefore ignitability is improved. If the molded article S is directly dried at a temperature of 105° C. to 120° C., there arises the fear that its shape will be affected so as to be warped or bent. Therefore, in order to gradually stabilize the shape, it is preferable to dry the molded article S at a low temperature at a first stage and dry it at a high temperature at a subsequent stage. In the gas generating agent 10 molded so as to squash both ends thereof, the squashed part is thinner than the thickness of the gas generating agent 10, and the squashed part is first burnt out, and therefore the gas generating agent 10 is burnt in a state in which both ends thereof are opened.

Since the gas generating agent 10 is molded so as to squash both ends thereof in this way, the squashed part of the end part 7 is gently burnt immediately after ignition, and then the gas generating agent 10 is rapidly burnt from the outer surface of the tube part and from the inner surface of the internal space 6. Therefore, a pressure-time curve is traced like the letter S, and the gas generating agent 10 is suitable as a gas generating agent used in an air-bag gas generator.

Additionally, since both ends thereof are squashed, the compression strength thereof is higher than that of a conventional single-hole tubular agent. Therefore, when the gas generating agent 10 is mounted in the vehicle as a gas generating agent at the time of the generation of gas, the gas generating agent 10 is superior in resistance to vibration, and a change in shape with the passage of time can be controlled.

Additionally, since the gas generating agent 10 of the present invention is higher in compression strength than the conventional single-hole tubular agent as mentioned above and since both end parts thereof are squashed to exhibit roundness, the gas generator can be filled with the gas generating agent 10 with a high filling density, and therefore the gas generator can be reduced in size and weight.

A gas generator for a device for protecting vehicle occupants, such as an air bag, that uses the gas generating agent of this embodiment can exhibit a preferred gas generation performance.

The present embodiment will be described according to the following examples. It is to be noted that the present embodiment is not limited to the following examples.

EXAMPLE 1

3% by weight ethanol and 13% by weight water were added to a composition mixed by a combination of 43.5% by weight guanidine nitrate, 25% by weight strontium nitrate, 25% by weight basic copper nitrate, 2.5% by weight acid clay, and 4% by weight polyacrylamide, and these were mixed and kneaded together to form a kneaded mass. The kneaded mass was extruded with an extrusion pressure of 8 MPa by means of an extruding machine provided with a die having an inner diameter of 2 mm and an inner-hole pin having an outer diameter of 0.5 mm at its outlet. A resulting molded article shaped like an extruding rod was sent between molding gears while being drawn by a drawing belt. The molded article was formed to have concave parts with intervals of 4.4 mm by means of convex teeth of the molding gears. The molded article was cut off in such a way as to be folded at the concave parts, and was then dried at a temperature of 55° C. for 8 hours, and was then dried at a temperature of 110° C. for 8 hours. As a result, a gas generating agent was obtained.

EXAMPLE 2

The above-mentioned substances were mixed and kneaded in the same way as in Example 1. Thereafter, the kneaded mass was extruded with an extrusion pressure of 8 MPa by means of an extruding machine provided with a die having an inner diameter of 2 mm and an inner-hole pin having an outer diameter of 0.8 mm at its outlet. A resulting molded article shaped like an extruding rod was sent between molding gears while being drawn by a drawing belt. The molded article was formed to have concave parts with intervals of 4.4 mm by means of convex teeth of the molding gears. The molded article was cut off in such a way as to be folded at the concave parts, and was then dried at a temperature of 55° C. for 8 hours, and was then dried at a temperature of 110° C. for 8 hours. As a result, a gas generating agent was obtained.

EXAMPLE 3

3% by weight ethanol and 13% by weight water were added to a composition mixed by a combination of 40.6% by weight guanidine nitrate, 25% by weight strontium nitrate, 25% by weight basic copper nitrate, 4.8% by weight acid clay, 2.3% by weight hydroxypropyl methylcellulose, 1.6% by weight polyvinylpyrrolidone, 0.5% by weight graphite, and 0.2% by weight silicon dioxide were mixed and kneaded together to form a kneaded mass. The kneaded mass was extruded with an extrusion pressure of 10 MPa by means of an extruding machine provided with a die having an inner diameter of 3 mm and an inner-hole pin having an outer diameter of 1.0 mm at its outlet. A resulting molded article shaped like an extruding rod was sent between molding gears while being drawn by a drawing belt. The molded article was formed to have concave parts with intervals of 4.4 mm by means of convex teeth of the molding gears. The molded article was dried at a temperature of 55° C. for 8 hours, and was then dried at a temperature of 110° C. for 8 hours. The molded article was cut off in such a way as to be folded at the squashed concave parts, and then classification was performed. As a result, a gas generating agent was obtained.

COMPARATIVE EXAMPLE 1

A molded article shaped like the extruding rod was molded in the same way as in Example 1. Thereafter, the molded article was drawn by the drawing belt and was dried in air. The molded article, which has reached the state of not being squashed, was cut off, and was dried at a temperature of 55° C. for 8 hours, and was then dried at a temperature of 110° C. for 8 hours. As a result, a gas generating agent was obtained.

COMPARATIVE EXAMPLE 2

A molded article shaped like the extruding rod was molded in the same way as in Example 2. Thereafter, the molded article was drawn by the drawing belt and was dried in air. The molded article, which has reached the state of not being squashed, was cut off, and was dried at a temperature of 55° C. for 8 hours, and was then dried at a temperature of 110° C. for 8 hours. As a result, a gas generating agent was obtained.

Figure 6:
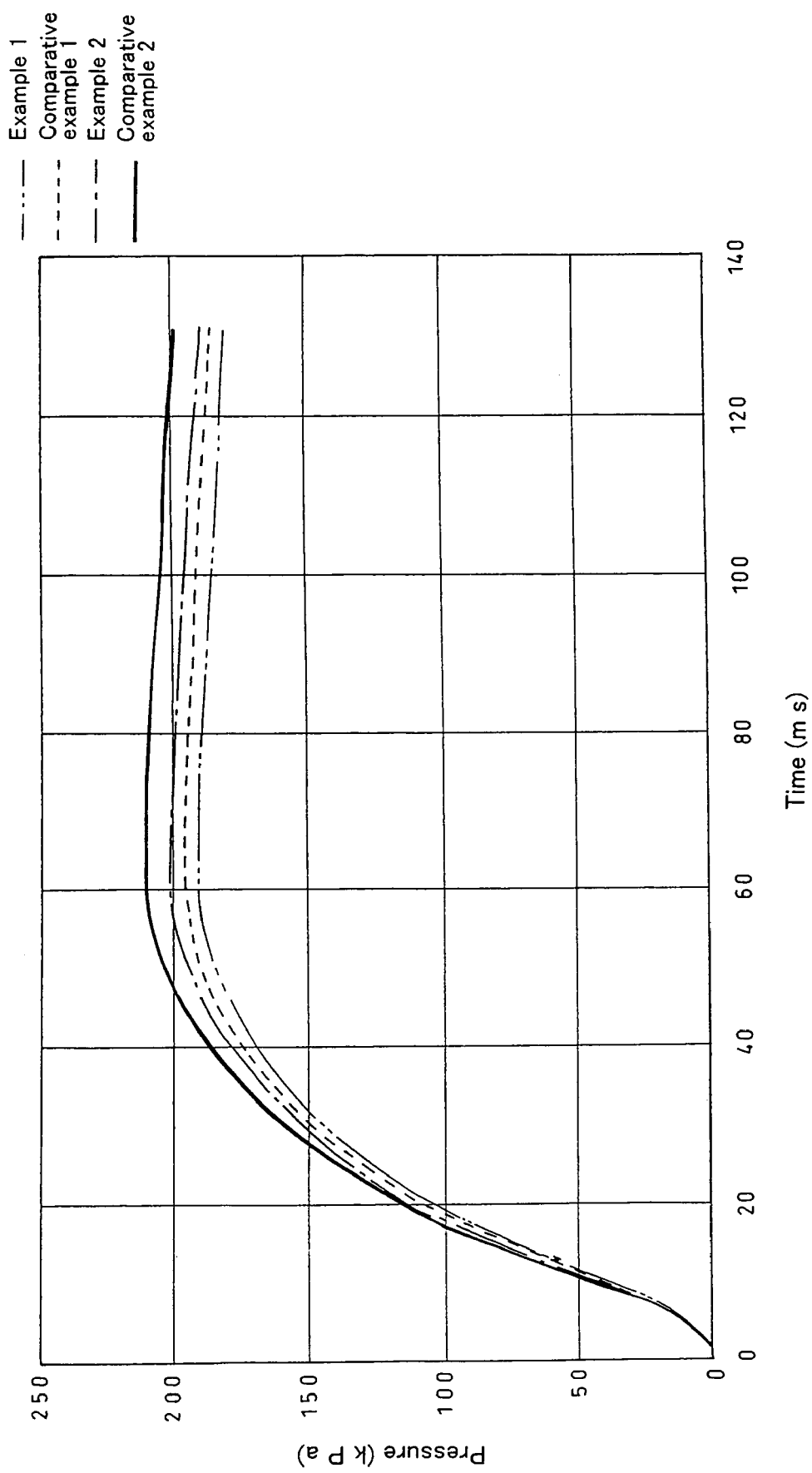
FIG. 6 shows results of a tank combustion test of the gas generating agent according to the present invention.

FIG. 7 and FIG. 6 show characteristics of the gas generating agents of Examples 1 and 2 and Comparative examples 1 and 2 mentioned above and results of tank combustion tests.

The tank combustion tests in FIG. 7 were conducted as follows. A stainless steel tank container whose internal volume is 60 liters was filled with each gas generating agent of Examples 1 and 2 and Comparative examples 1 and 2. A gas generator provided with an ignition device was attached thereto, and the gas generating agent placed in the tank container was burnt by outside ignition. The internal pressure of the tank container on a time base was measured by a piezoelectric element disposed in the tank container.

As is understood from FIG. 7 and FIG. 6, the pressure-time curve is traced like the letter S in Examples 1 and 2 and in Comparative examples 1 and 2 according to this embodiment. However, the gas generating agent molded so that both ends thereof are squashed as in Examples 1 and 2 according to the present invention is characterized in that time from ignition to start-up and time from the start-up to the attainment of a tank maximum pressure are longer than those of the corresponding gas generating agents of Comparative examples 1 and 2. Therefore, the gas generating agents of Examples 1 and 2 according to the present invention are burnt more gently than the corresponding gas generating agents of Comparative examples 1 and 2. Thus, it has been understood that the gas generating agent according to the present invention can moderate a mechanical shock caused by rapid inflation of an air bag at the beginning of air-bag expansion.

Although the present invention was described with reference to the above-mentioned preferred embodiment, the present invention is not limited to this. It will be understood that various embodiments not departing from the spirit and scope of the present invention can be carried out.

The invention claimed is:

1. A gas generating agent wherein the gas generating agent is a tubular molded article formed with a non-azide-based composition, and both ends of the molded article are squashed, thereby forming non-squashed parts and squashed parts, the squashed parts having an external thickness less than the external thickness of the non-squashed parts, and an inner diameter d of an internal space of the molded article being less in the squashed parts than in the non-squashed parts, whereby said molded article, upon ignition, burns at one rate followed by burning at a faster rate.

2. The gas generating agent as recited in claim 1, wherein an outer diameter D of the molded article of the gas generating agent is from 1.4 mm to 4 mm, a length L thereof is from 1.5 mm to 8 mm, and the inner diameter d of an internal space of the molded article in the non-squashed parts is from 0.3 mm to 1.2 mm.

3. The gas generating agent as recited in claim 1 or claim 2, wherein time T(ms) from the start-up of a tank pressure to the attainment of a tank maximum pressure P(kPa) is from 20 ms to 100 ms, and a pressure-time curve is traced like the letter S.

4. The gas generating agent as recited in claim 1 or claim 2, wherein the non-azide-based composition comprises a nitrogen-containing organic compound, an oxidizing agent, a slag forming agent, and a binder.

5. The gas generating agent as recited in claim 4, wherein the non-azide-based composition has a combination of the nitrogen-containing organic compound ranging from 32.5% by weight to 60% by weight, the oxidizing agent ranging from 35% by weight to 65% by weight, the slag forming agent ranging from 0.5% by weight to 15% by weight, and the binder ranging from 0.5% by weight to 15% by weight.

6. The gas generating agent as recited in claim 4, wherein the nitrogen-containing organic compound is at least one compound selected from the group consisting of a tetrazole derivative and a guanidine derivative.

7. The gas generating agent as recited in claim 4, wherein the nitrogen-containing organic compound comprises at least one of guanidine nitrate, nitroguanidine, and 5-aminotetrazole; the oxidizing agent comprises at least one of strontium nitrate, basic copper nitrate, phase-stabilized ammonium nitrate, potassium nitrate, and ammonium perchlorate; the slag forming agent comprises at least one of silica, acid clay, and silicon nitride; and the binder comprises at least one of hydroxypropyl methylcellulose, polyvinylpyrrolidone, and polyacrylamide.

8. The gas generating agent as recited in claim 7, wherein the nitrogen-containing organic compound comprises guanidine nitrate ranging from 32.5% by weight to 60% by weight; the oxidizing agent comprises strontium nitrate or basic copper nitrate ranging from 35% by weight to 65% by weight; the slag forming agent comprises acid clay ranging from 0.5% by weight to 15% by weight; and the binder comprises at least one of polyacrylamide, hydroxypropyl methylcellulose, polyvinylpyrrolidone, graphite, and silicon dioxide ranging from 0.5% by weight to 15% by weight.

9. An air-bag gas generator using the gas generating agent of claim 1.

10. An air-bag gas generator using the gas generating agent of claim 2.

11. An air-bag gas generator using the gas generating agent of claim 3.

12. An air-bag gas generator using the gas generating agent of claim 4.

13. An air-bag gas generator using the gas generating agent of claim 5.

14. An air-bag gas generator using the gas generating agent of claim 6.

15. An air-bag gas generator using the gas generating agent of claim 7.

16. An air-bag gas generator using the gas generating agent of claim 8.

* * * * *